United States Patent [19]

Merrett et al.

[11] Patent Number: 5,378,047
[45] Date of Patent: Jan. 3, 1995

[54] CONTAINER UNLOADING ASSEMBLY FOR GRAVITY UNLOADING OF PARTICULATE MATERIAL

[75] Inventors: Ronald G. Merrett; Oscar Eakin, Jr., both of Houston, Tex.

[73] Assignee: Intermodal Container Systems, Houston, Tex.

[21] Appl. No.: 230,876

[22] Filed: Apr. 20, 1994

Related U.S. Application Data

[63] Continuation of Ser. No. 897,419, Jun. 15, 1992, abandoned.

[51] Int. Cl.6 .......................... B60P 1/16; B65G 53/46
[52] U.S. Cl. ................................. 298/17 R; 406/39; 410/129
[58] Field of Search ............... 220/1.5, 404, 601, 653, 220/729; 222/105; 406/36, 39, 41, 43, 44, 63, 64, 65, 67, 73, 131; 410/129, 141; 298/17 R

[56] References Cited

U.S. PATENT DOCUMENTS

| | | | |
|---|---|---|---|
| 3,386,605 | 6/1968 | LaFont | 220/1.5 |
| 4,124,136 | 11/1978 | Bjelland et al. | 410/129 X |
| 4,701,087 | 10/1987 | Cain et al. | 410/141 X |
| 4,799,607 | 1/1989 | Podd | 222/105 X |
| 4,875,811 | 10/1989 | Merrett et al. | 298/22 R X |
| 5,096,336 | 3/1992 | Merrett et al. | 298/17 SG X |

FOREIGN PATENT DOCUMENTS 0021814  1/1981  European Pat. Off. ........... 220/1.5

*Primary Examiner*—Michael S. Huppert
*Assistant Examiner*—Janice L. Krizek
*Attorney, Agent, or Firm*—Bush, Moseley & Riddle

[57] ABSTRACT

A container unloading assembly for gravity unloading of particulate material from the rear end of a container (10) removably mounted on a trailer (11) upon the tilting of the front end of the container. A rear support frame (50) is removably secured to opposed sides (12) of the container (10) and has a lower opening (64) removably receiving a lading discharge outlet (84) connected to the frame (50) for controlling the flow of particulate material from the container (10) during the unloading operation. Particulate material is loaded within a flexible bag (26) adjacent a rear end bulkhead (42) and rear support frame (50) supports rear end bulkhead (42).

10 Claims, 5 Drawing Sheets

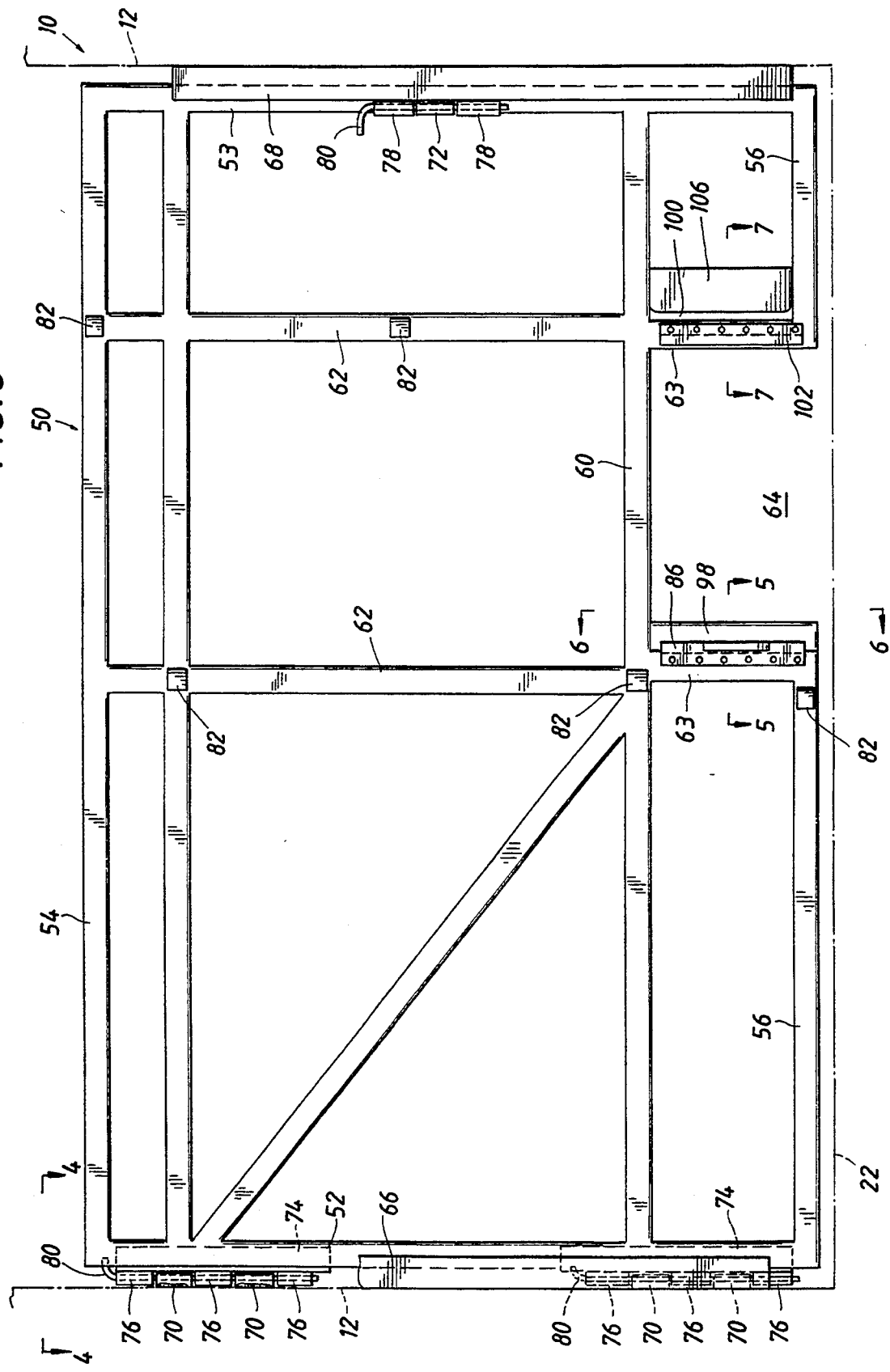

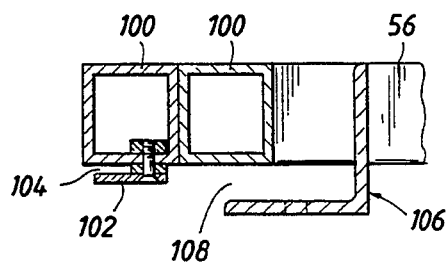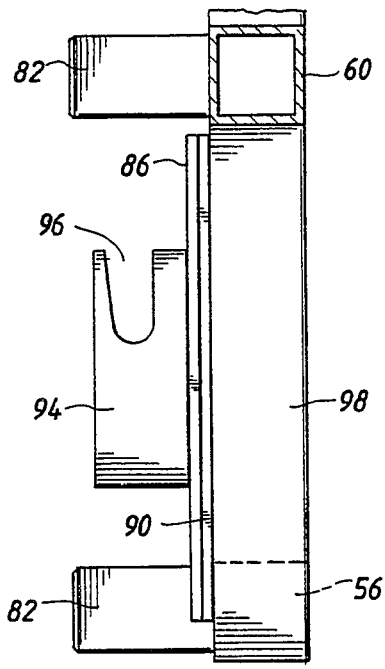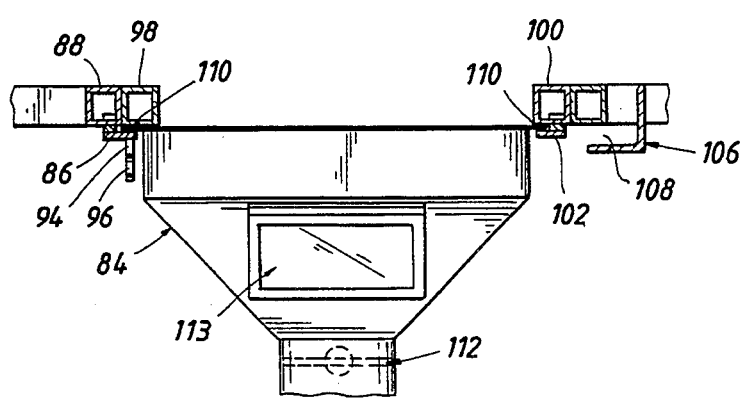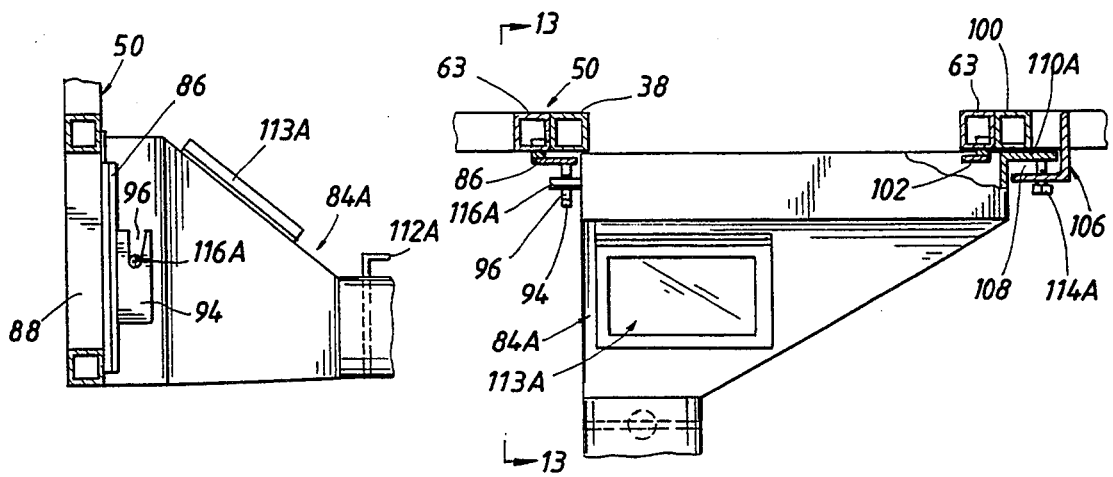

CONTAINER UNLOADING ASSEMBLY FOR GRAVITY UNLOADING OF PARTICULATE MATERIAL

This application is a continuation of application Ser. No. 07/897,419 filed Jun. 15, 1992, now abandoned.

FIELD OF THE INVENTION

This invention relates to a container unloading assembly for gravity unloading of particulate lading or material at an unloading site, and more particularly to such a container unloading assembly for the unloading of particulate lading at the unloading site upon upward tilting of the front end of the container.

BACKGROUND OF THE INVENTION

Particulate ladings, such as polycarbonate or thermoplastic materials, synthetic resins, for example, are normally loaded within boxes, bags, containers or the like at a site where the polycarbonate plastic material is manufactured, and then transported by wheeled vehicle to a site where the plastic material is unloaded from the container into a storage facility for subsequent use in the manufacture of various plastic end products. It is highly desirable that such plastic materials or ladings, such as polyethylene pellets, not be contaminated by foreign matter or the like as even small amounts of foreign matter or contamination affect the quality of the subsequent manufactured products. Heretofore, plastic liners or bags such as vinyl or polyethylene liners have been used within containers to protect the lading from contamination. The plastic liners are normally sealed at the initial loading site and the lading is maintained in sealed relation within the plastic liner until unloaded at the unloading site, thereby insuring that the plastic lading will not be contaminated. Normally, the plastic lading is unloaded at the unloading site from the container by a suction or vacuum line extending within the container and then is conveyed pneumatically to a storage facility, such as bins, silos, or the like, until needed for the production of plastic end products. Pressurized air is sometimes used to push or aid in pushing the particulate material from a container into a pneumatic discharge line for pneumatically conveying the particulate material into the storage facility.

Heretofore, such as shown in U.S. Pat. No. 4,875,811 dated Oct. 24, 1989 and U.S. Pat. No. 5,096,336 dated Mar. 13, 1992 a container has been used in intermodal transportation by mounting on railway flat cars, container ships, or highway trailers, for example, for the transport of particulate material with the particulate material being sealed in a flexible bag within the container and then unloaded at an unloading site by tilting of an end of the container. The transportation system illustrated in U.S. Pat. No. 4,875,811 transports particulate material in a sealed condition from one location or site where the particulate lading is loaded into a container having a liner or bag therein, to another location or site where the sealed liner or bag within the container is broken for unloading of the particulate lading from the container into a storage area. Such a system is utilized also for the transport of other various particulate materials, such as, for example, granular or powdered materials used in foodstuffs.

The container after being loaded and sealed at the first site is transferred to a tiltable container support frame on a highway vehicle for transport to the second site where the sealed container is broken and then tilted by a tiltable support frame to an angle above the angle of repose of the lading within the container for discharge of the lading by gravity from the container into a pneumatic discharge line for pneumatic conveying to a suitable storage facility, such as a storage bin or silo.

One end of the container has a pair of rear doors which are normally latched in closed position during transit. The bag fitting between a pair of end bulkheads is filled with lading from a flexible hose extending within an upper tubular inlet extension or neck of the bag. Upon filling of the bag with lading the bag is urged against the end bulkheads and the extending tubular extension is sealed by suitable banding or ties. Thus the lading is sealed within the bag for transport to an unloading site.

The loaded container as illustrated in U.S. Pat. No. 4,875,811 is then transferred to a tiltable container support frame pivotally mounted on a highway trailer body and is releasably secured thereon for transport by a highway vehicle to an unloading site. At the unloading site, at least one of the end doors of the container is opened and a discharge outlet for the pneumatic conveying apparatus is removably connected adjacent the rear end of the container for unloading of the container. The inner end of a lower tubular extension or spout of the bag is sealed at its juncture with the bag by a sealing membrane defined by the portion of the bag covering the inner end of the lower spout. This sealing membrane must be cut or removed in order for the lading to be unloaded from the plastic bag. Thus, the lading is tightly sealed upon loading within the plastic bag, and the plastic bag remains in a sealed condition until it is opened by slitting the membrane for gravity discharge directly into a pneumatic conveyor through the discharge outlet at the unloading site. The container or the plastic bag is not pressurized in any manner during unloading and the plastic bag collapses as the lading is removed or discharged. Thus, loss of lading after being loaded within the plastic bag in the container until the lading is discharged into the pneumatic unloading system at the unloading site is minimized.

The pneumatic conveying apparatus and the connecting lading conduits between the rear end of the container and the pneumatic conveying apparatus are positioned between the rear end of the container and the rear tandem wheels in order to permit an effective and satisfactory gravity unloading of particulate lading from the rear end of the tilted container to a rotary valve which feeds the particulate lading into an air stream in a lower pneumatic hopper for pneumatic conveyance to a storage site such as a silo, for example. A flexible lading conduit connects a throttling control valve on the discharge outlet adjacent the rear end of the tilted container and the rotary valve for the pneumatic hopper below the container for unloading the lading at a relatively fast flow rate from the container.

SUMMARY OF THE INVENTION

This invention is directed particularly to a container unloading assembly for a transportation system for transporting particulate material in a sealed condition within a bag in the container. A portable subassembly for the bag includes a plastic bag having opposed ends thereof secured to a pair of opposed rectangular bulkheads preferably formed of cardboard. Prior to loading of the particulate material within the container the portable subassembly including the two end bulkheads are mounted within the container at opposite ends of the container with one end bulkhead being adjacent the rear doors of the container at the unloading end thereof and the other removable bulkhead being adjacent the front end wall of the container. The container unloading assembly of the present invention includes a rear support frame removably secured to opposite sides of the container between the movable rear bulkhead and the rear doors. The rear support frame has a lower discharge opening and a discharge outlet housing is removably mounted on the frame at the unloading site for accurate alignment with the lower discharge opening. The frame includes support and attachment means for attachment of the discharge outlet at the unloading site upon opening of the rear doors.

When the front end of the container is tilted for unloading of the lading, the weight of the particulate lading against the rear bulkhead increases and it is necessary to support the rear bulkhead during the unloading operation. Normally, a lower tubular unloading spout on the plastic bag adjacent the rear doors is positioned for alignment with the discharge housing and a manually operated control valve for the discharge housing controls the flow of particulate material from the plastic bag.

Thus, the container of the present invention has a rear gate or support frame removably mounted on opposite sides of the container between a movable rear bulkhead within the container and the rear doors for supporting the rear bulkhead particularly upon tilting and unloading of the container. The rear support frame includes a lower discharge opening and adjacent retaining brackets to receive at the unloading site a discharge outlet housing having a control valve therein to control the flow of particulate material from the plastic bag. The rear support frame may be easily removed from the container when not in use and is easily installed within the container when required.

It is an object of this invention to provide a container unloading assembly for the gravity unloading of particulate lading from the container upon upward tilting of the front end of the container including mounting means within the container for a discharge outlet housing adjacent the rear doors of the container to control the flow of lading from the container.

It is another object of this invention to provide such a container unloading assembly including a rear gate or rear support frame for an intermodal container for the transport of particulate lading and mounted adjacent the rear doors of the container for supporting a rear rectangular bulkhead upon the tilting and unloading of the particulate material.

It is a further object of this invention to provide such a rear support frame which is easily installed and removed from the container.

An additional object of this invention is to provide such a support frame having means to support and mount a discharge outlet housing including a control valve thereon for controlled gravity unloading of particulate material upon opening of the rear doors and tilting of the container.

Other objects, features, and advantages of this invention will become more apparent after referring to the following specification and drawings.

BRIEF DESCRIPTION OF THE DRAWINGS

FIG. 3 is an enlarged end elevation of the rear support frame of the present invention removably connected between opposed sides of the container;

FIG. 6 is a section along line 6—6 of FIG. 3;
FIG. 7 is a section along line 7—7 of FIG. 3;

FIG. 9 is a top plan of the discharge outlet of FIG. 8 mounted on the support frame;

FIG. 12 is a side elevation of another embodiment of a discharge outlet housing detachably connected to the rear support frame; and FIG. 13 is a front elevation of the embodiment of the discharge outlet housing shown in FIG. 12 mounted on the rear support frame.

DESCRIPTION OF THE INVENTION

Figure 1:
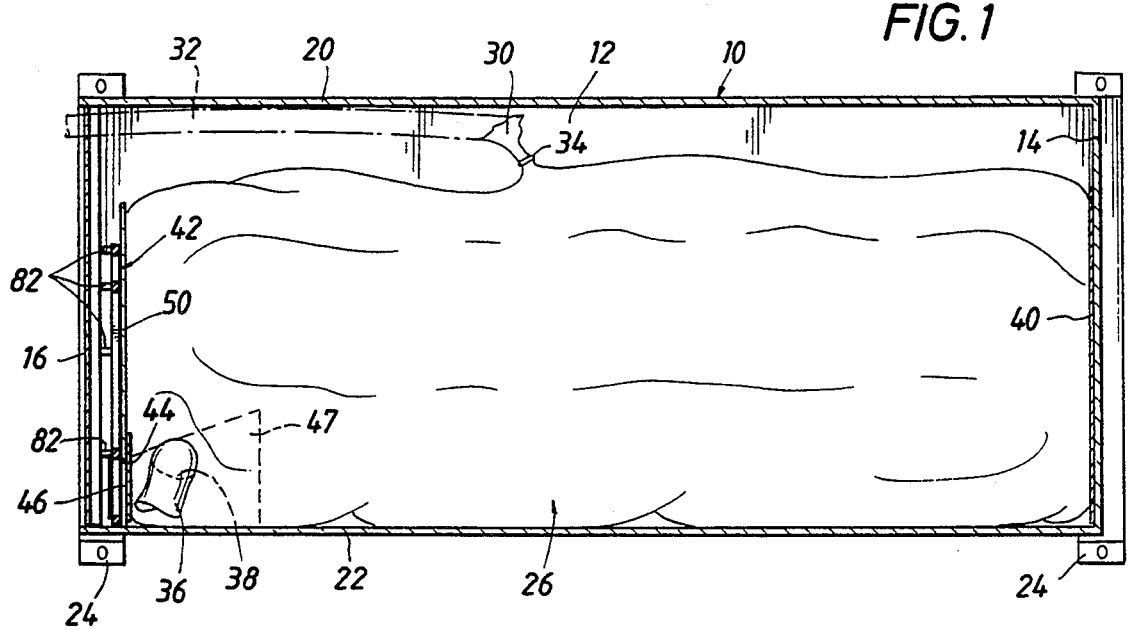
FIG. 1 is a sectional view of an intermodal container in accordance with the present invention showing a bag in the container loaded with lading and positioned between a pair of end bulkheads.
Figure 2:
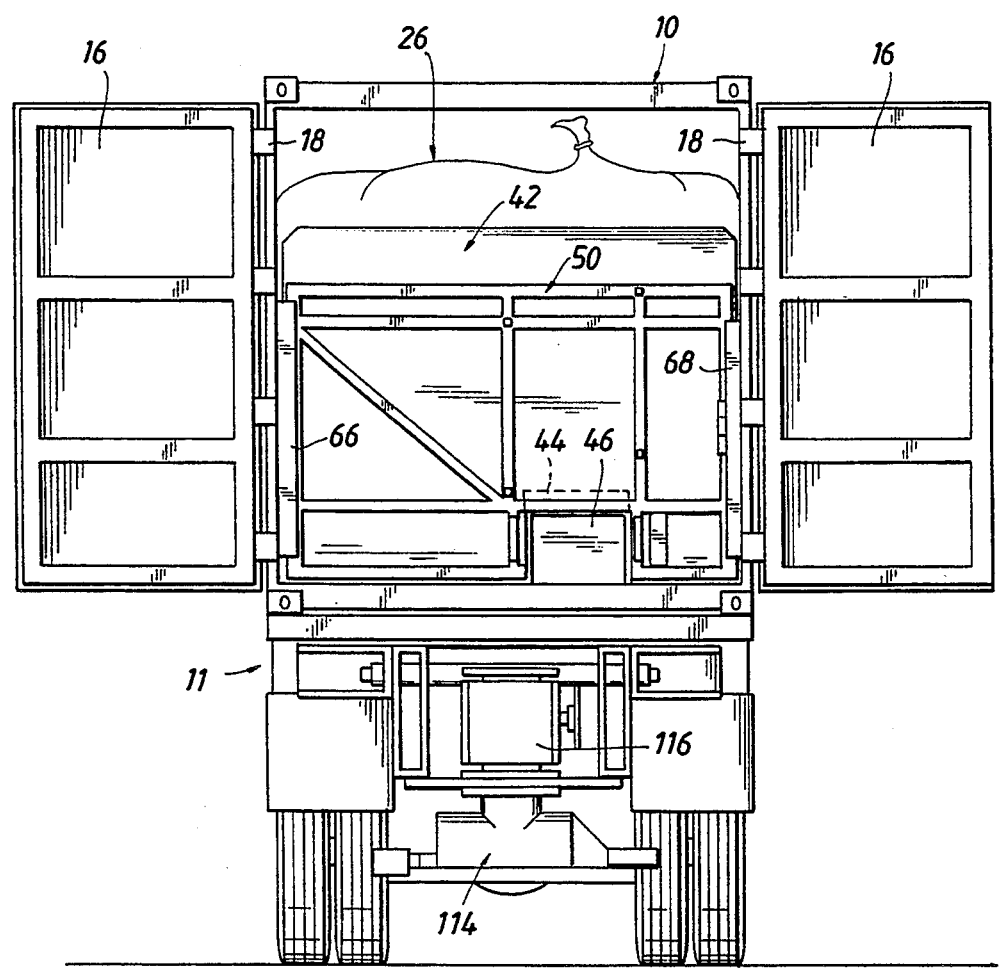
FIG. 2 is a rear elevation of the container shown in FIG. 1 with the rear doors opened and the rear support frame connected to opposed sides of the container between the rear end bulkhead and the end doors.
Figure 8:
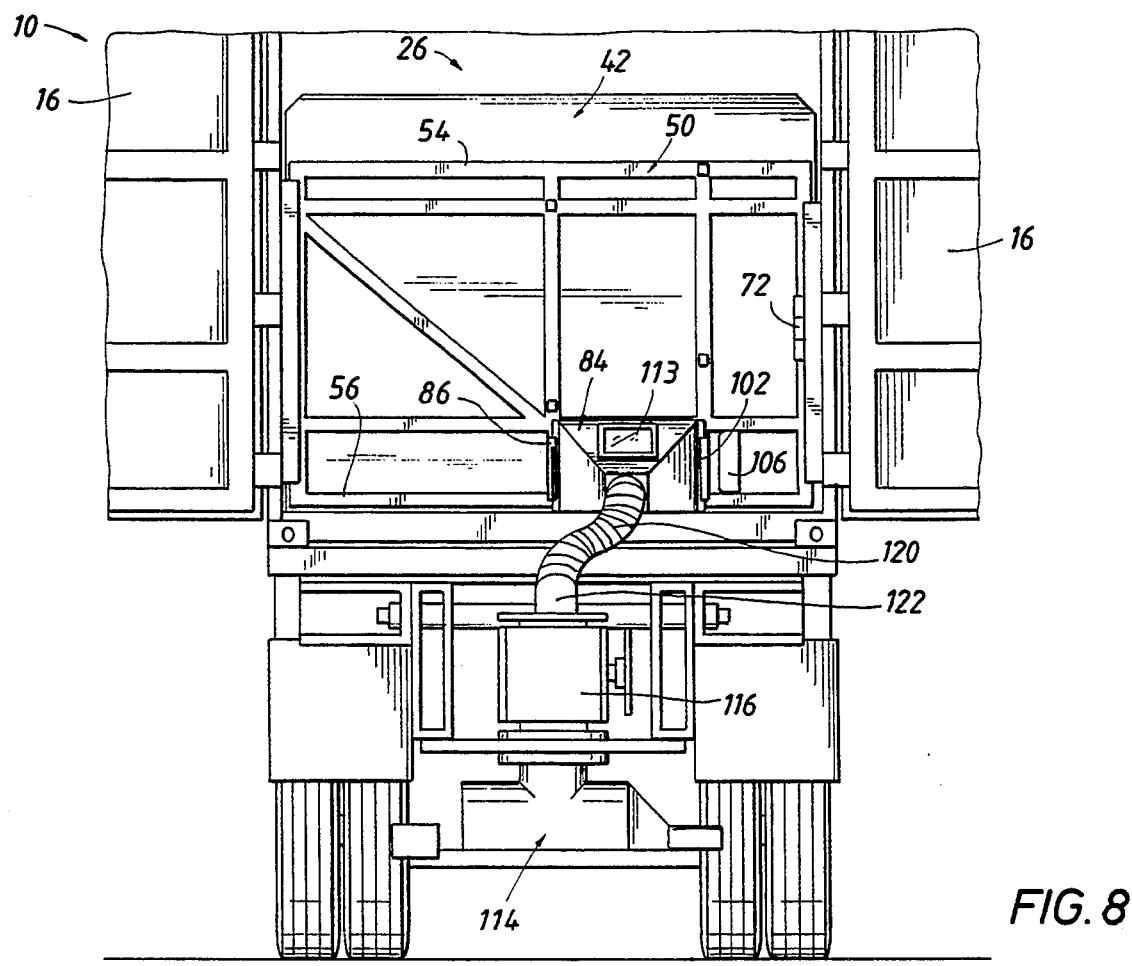
FIG. 8 is a rear elevation of the container mounted on a trailer and showing the discharge outlet housing connected to the support frame for controlling the flow of lading to a lower pneumatic hopper.
Figure 4:
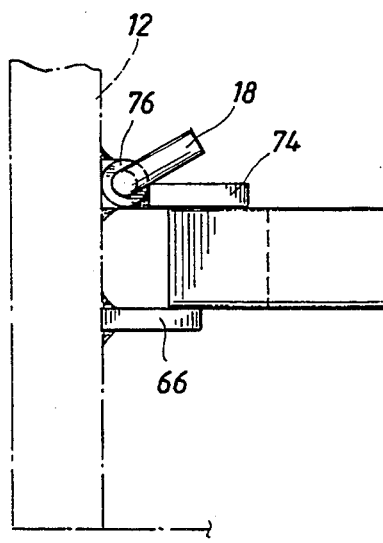
FIG. 4 is a section along line 4—4 of FIG. 3.

Referring now to the drawings for a better understanding of the invention, FIG. 1 shows a container 10 and FIG. 2 shows container 10 mounted on a highway trailer generally indicated at 11 for surface transportation. Container 10 is preferably a standard container such as twenty (20) feet in length used in intermodal transportation such as in so-called COFC (container on flat car) service, container ships, or highway trailers, and has a pair of sides 12 connected by an end 14 at one end. The other end of container 10 has a pair of doors 16 hinged at 18 for movement between open and closed positions. Doors 16 may be releasably latched together in closed position. Container 10 has a top 20 and a bottom 22. Mounted on the corners of bottom 22 are corner fittings 24 which have suitable openings therein adapted to receive locking pins for releasably mounting container 10 onto supporting transport means, such as highway trailer 11.

Container 10 of the present invention is preferably utilized with highway vehicles and with the transport of particulate lading, such as plastic pellets, grain, powdered foodstuff, or the like, used in the manufacture of various end products. The particulate material is normally transported from one site where the particulate material is made to a plant at another site where the end products are made from the particulate material. It is highly desirable that such materials not be contaminated with foreign matter as the quality of the end product may be affected. Thus, it is desirable that the lading be sealed from the environment after being loaded into container 10 until unloaded at an unloading site for conveyance to a storage facility where the particulate material enters a process for making the end product.

For this purpose, a plastic bag generally indicated at 26 and formed of polyethylene having a thickness of around 0.012 inch, for example, is placed within container 10 to receive the lading therein. Bag 26, as shown particularly in FIG. 1 has an upper tubular extension or boot 30 which receives a flexible discharge hose shown in broken lines at 32 for discharge of particulate lading into bag 26. After filling of bag 26, tubular extension 30 is sealed by a band 34. It is noted that a lower tubular extension or spout 36 is provided and a membrane or closure 38 closes spout 36. For unloading of the particulate lading from bag 26 the closure 38 is slit or punctured.

A portable subassembly for bag 26 is provided comprising a pair of opposed end bulkheads 40 and 42 of a generally rectangular shape. Bulkheads 40 and 42 are preferably formed of cardboard or plywood and the ends of bags 26 are secured to opposed bulkheads 40 and 42 to provide a collapsible pack prior to positioning within container 10. Rear bulkhead 42 has a removable flap 44 covering a discharge opening 46 which receives spout 36 for unloading upon removal of flap 44 at the unloading site. In order to prevent or minimize lading from collecting in the corners adjacent opening 46, suitable diverging cardboard wing members 47 may be provided adjacent opening 46 to direct the lading in bag 26 toward discharge opening 46 thereby providing a maximum cleanout of lading from container 10 and plastic bag 26.

Forming an important part of this invention is a rectangular support frame or gate generally indicated at 50 as shown particularly in FIGS. 1 and 3. Support frame 50 is preferably formed of metal such as aluminum, and includes a pair of side vertical frame members 52, an upper horizontal frame member 54, lower horizontal frame member 56, intermediate horizontal members 60, and intermediate vertical members 62. A lower discharge opening 64 is provided by a cutaway portion of lower frame member 56 with intermediate vertical members 63 and lower intermediate horizontal frame member 60 defining discharge opening 64 which is in axial alignment with removable flap 44 on rear bulkhead 42. Discharge opening 64 is adapted to receive an unloading discharge outlet at the unloading site upon opening of rear doors 16.

Support frame 50 is normally mounted on opposed sides 12 of container 10 after rear bulkhead 42 has been positioned within container 10 and prior to loading of bag 26 in order to provide support to rear bulkhead 42. For mounting of support frame 50 on container 10, flanges 66, 68 are secured to container sides 12. Hinge portions 70 are secured to side 12 and hinge portion 72 is secured to flange 68. Hinge mounting plates 74 are secured to the rear surface of side frame member 52 and hinge portions 76 are secured thereto. Hinge portions 78 are secured to the front surface of side member 53. To mount support frame 50, hinge portions 76 and 78 on support frame 50 are vertically aligned with respective hinge portions 70 and 72 and then pins 80 are inserted. In this position, support frame 50 supports rear bulkhead 42 during the loading operation and during transport to the unloading site. Projecting spacer blocks or members 82 are secured to frame members 56, 62 and space rear doors 16 from support frame 50 when doors 16 are closed as shown in FIG. 1.

Figure 5:
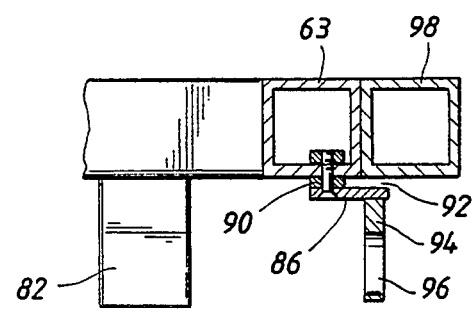
FIG. 5 is a section along line 5—5 of FIG. 3.

At the unloading site, a discharge outlet such as shown generally at 84 in FIG. 9 is connected to frame 50 at opening 64 for receiving lading from bag 26. Referring to FIGS. 5-7, support frame 50 is especially designed to receive a discharge outlet at opening 64 and includes attachments adjacent opening 64. As shown in FIGS. 5 and 6, a flange 86 attached to tubular frame member 88 and spaced therefrom by spacer 90 forms a receiving slot 92. A projection 94 on flange 86 has an upwardly opening slot 96 adapted to receive a pin or the like in a supporting relation. A reinforcing member 98 is secured to tubular frame member 63. Referring to FIG. 7, reinforcing tubular frame member 100 extends alongside frame member 63 and a flange 102 is secured to frame member 63 to define a receiving slot 104. An angle member 106 secured between frame members 56 and 60 defines a receiving slot or groove 108 and projects outwardly beyond flange 102.

Various types of discharge outlets may be connected to frame 50 for alignment with discharge opening 64 for the gravity unloading of lading upon tilting of container 10. Receiving slots or grooves 92, 104 formed by flanges 86 and 102 are adapted to receive flanges 110 on discharge outlet 84 as shown in FIG. 9. Outlet 84 includes a throttling valve such as a butterfly valve shown generally at 112 to control the flow of lading from container 10 and a movable lid or cover 113 including a transparent window for viewing the flow of lading.

Figure 10:
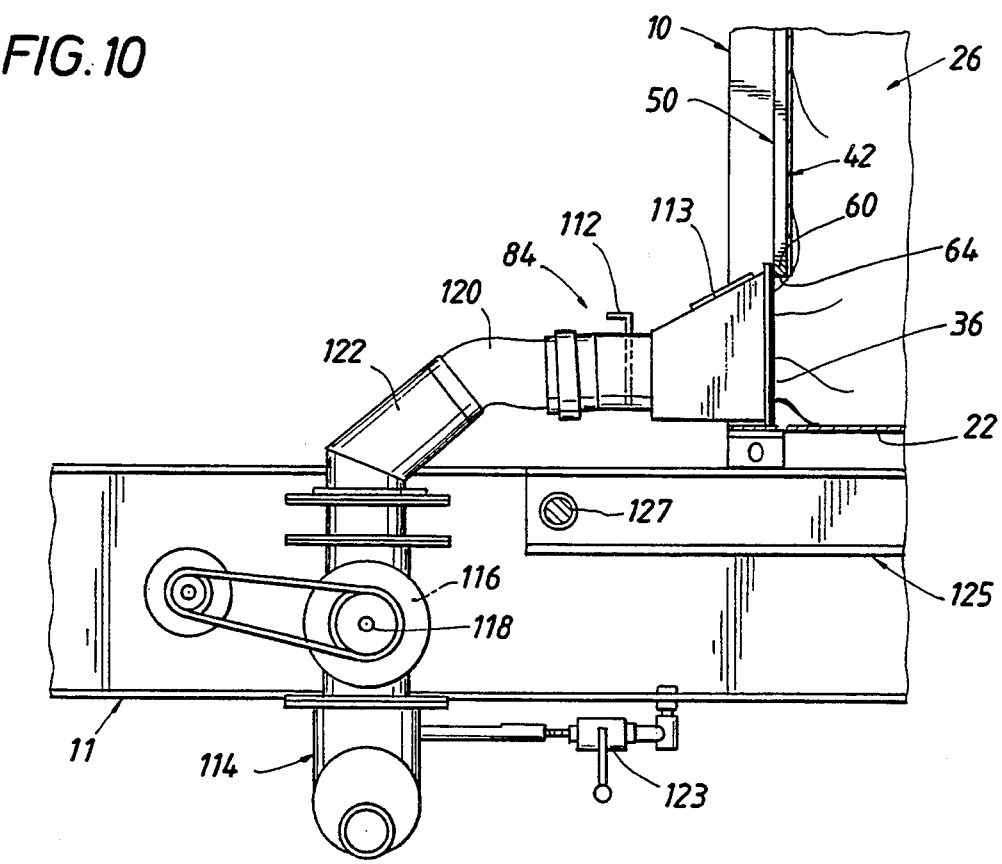
FIG. 10 is an enlarged partial side elevation of the unloading apparatus showing the discharge outlet housing between the container and the pneumatic hopper for unloading of the lading.
Figure 11:
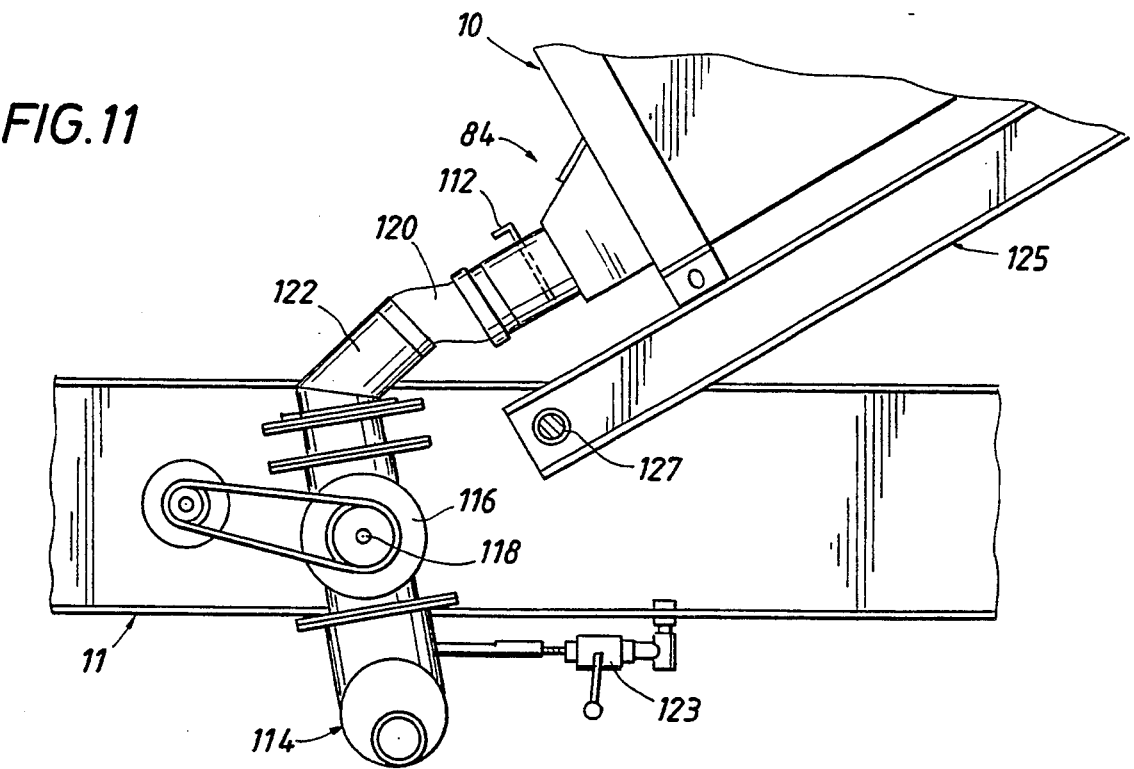
FIG. 11 is an enlarged partial side elevation of the unloading apparatus similar to FIG. 10 but showing the container in a tilted relation to effect a gravity flow of lading from the container into the pneumatic hopper.

Discharge outlet 84 as shown in FIGS. 9-11 is connected to a pneumatic hopper 114 mounted on trailer 11 and adapted for connection to an unloading hose for pneumatic conveyance of the lading to a suitable storage facility, such as a bin or silo, for example. A rotary valve 116 mounted for rotation on shaft 118 includes an air lock and feeds the lading into pneumatic hopper 114 for pneumatic conveyance. A flexible hose 120 is connected between a receiver 122 for rotary valve 116 and discharge outlet 84 at the unloading site. Hopper 114 and receiver 122 are mounted for pivotal movement about shaft 118 by manual actuation of screw type actuator shown at 123. Container 10 is shown mounted on a container support frame 125 which is adapted to be tilted about pivot 127 as shown in FIG. 11 for unloading container 10. As shown in FIGS. 10 and 11 after attachment of discharge outlet 84 to support frame 50, movable lid 113 on discharge outlet 82 is lifted to an open position and an operator reaches within the outlet and removes flap 44 on rear bulkhead 42 from opening 46. The operator then grips spout 36 to position spout 36 within opening 46 in bulkhead 42 and aligned opening 64 in support frame 50. Then, closure 38 is slit to commence the flow of lading from bag 26.

Next, container support frame 125 and container 10 are tilted to an angle as shown in FIG. 11 which is slightly greater than the angle of repose of the lading being unloaded to permit the gravity unloading of the lading. Receiver 122 during tilting of container 10 is pivoted about shaft 118 by manual actuation of actuator 123 for positioning receiver 122 at a desired angle relative to outlet 84. Support frame 50 supports end bulkhead 42 during the unloading operation and maintains discharge outlet 84 in proper position for the unloading operation. Flanges 110 of discharge outlet 84 are easily inserted within slots 92 and 104 formed by flanges 86 and 102 and outlet 84 is maintained therein without any further adjustments. After the unloading operation is completed, discharge outlet 84 may be easily removed from slots 92 and 104 by upward lifting of outlet 84. Also, support frame 50 may be easily removed from container 10 by removal of pins 80. For further details of the unloading operation, reference is made to the aforementioned U.S. Pat. No. 4,875,811 the entire disclosure of which is incorporated herein.

Referring to FIGS. 12 and 13, another type of discharge outlet 84A is shown attached to support frame 50. Discharge outlet 84A has a side flange 110A on one side thereof received within slot 108 formed by angle 106 and is clamped therein by an adjusting nut 114A. The other side of discharge outlet 84A has a projecting pin or rod 116A which is received within slot 96 of projecting flange 94. Thus, discharge outlet 84A is easily installed and removed from support frame 50. A suitable butterfly control valve 112A and movable transparent lid or cover 113A are provided for discharge outlet 84A.

From the above, it is apparent that support frame 50 may be adapted for use with various types of discharge outlets and for the purposes of illustration, only two types of discharge outlets have been illustrated as it is understood that other discharge outlets may be utilized in a satisfactory manner with support frame 50 of the present invention.

While a preferred embodiment of the support frame of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. In a container removably mounted on a highway trailer for the transport and gravity unloading of particulate lading from the rear end of the container through a discharge outlet upon the raising of the front end of the container to tilt the container about its rear end, the container having a rear generally rectangular bulkhead and rear doors; the improvement comprising:

a generally rectangular rear support frame removably secured to opposed sides of said container between said rear bulkhead and said rear doors and adapted to support said rear bulkhead particularly upon tilting of the container to a predetermined angular relation with the trailer, said rear support frame having a lower opening adjacent its lower end adapted to receive said discharge outlet therein for controlling the flow of particulate lading from the container.

said generally rectangular rear support frame being formed of metal frame members secured to each other and including a pair of vertically extending side frame members along opposite sides of said support frame;

said vertically extending side frame members and said container having interfitting hinge portions thereon, and removable pins fitting within said interfitting portions for removably mounting said rear support frame to opposed sides of said container.

2. In a container removably mounted on a highway trailer for the transport and gravity unloading of particulate lading from the rear end of the container through a discharge outlet upon the raising of the front end of the container to tilt the container about its rear end, the container having a rear generally rectangular bulkhead and rear doors; the improvement comprising:

a one piece generally rectangular rear support frame removably secured to opposed sides of said container between said rear bulkhead and said rear doors and adapted to support said rear bulkhead particularly upon tilting of the container to a predetermined angular relation with the trailer, said rear support frame having a lower discharge opening adjacent its lower end adapted to receive said discharge outlet therein for controlling the flow of particulate lading from the container;

said one piece generally rectangular rear support frame being formed of rigid frame members secured to each other and including a pair of vertically extending side frame members along opposite sides of said support frame; and interfitting mounting means on said vertically extending side frame members and opposed sides of said container for removably mounting said rear support frame to opposed sides of said container.

3. In a container as set forth in claim 2;

said rear support frame having a lower horizontal frame member with a cutaway portion therein, and a pair of spaced intermediate vertical frame members extending upwardly from said horizontal frame member adjacent said cutaway portion to define said discharge opening therebetween.

4. In a container as set forth in claim 3;

retaining members on said intermediate vertical frame members adapted to releasably mount said discharge outlet thereon.

5. A container unloading assembly for gravity unloading of particulate material from the rear end of a container removably mounted on a trailer upon the tilting of the front end of the container; the container having a rear bulkhead to support the particulate material particularly upon tilting of the container and rear doors adjacent the bulkhead which are opened for unloading the particulate material; said container unloading assembly comprising:

a generally rectangular one piece rear support frame mounted between opposed sides of the container between said rear bulkhead and said rear doors, said one piece rear support frame being formed of connected metal frame members and including a pair of vertically extending side frame members along opposed sides of said support frame, said rear support frame having a lower discharge opening adjacent its lower end adapted to allow the particulate material to flow from the container for unloading and retaining means adjacent said lower opening;

cooperating latching means on said side frame members and said opposed sides of said container for removably connecting said rear support frame to said opposed sides; and a discharge outlet having a housing removably mounted within said lower discharge opening and connected to said retaining means for positioning said discharge outlet accurately relative to said discharge opening for receiving the particulate material from said container during unloading.

6. The container unloading assembly as set forth in claim 5;

said rear support frame having a lower horizontal frame member with a cutaway portion therein, and a pair of spaced intermediate vertical frame members extending upwardly from said horizontal frame member adjacent said cutaway portion to define said discharge opening therebetween.

7. The container unloading assembly as set forth in claim 6;

said retaining means comprising retaining members mounted on said intermediate vertical frame members for releasably mounting said discharge outlet.

8. The container unloading assembly as set forth in claim 6;

said rear bulkhead having a discharge opening in axial alignment with said discharge opening in said rear support frame, and a removable flap covering said discharge opening in said bulkhead adapted to be removed at the unloading site.

9. The container unloading assembly as set forth in claim 5;

said container having a vertical flange on each opposed side thereof projecting inwardly from the associated side, and said one piece rear support frame is positioned against said vertical flanges for engagement of said cooperating latching means for removably connecting said rear support frame to said opposed sides.

10. The container unloading assembly as set forth in claim 8 wherein a flexible bag is secured to said rear bulkhead and adapted to be filled with particulate material, said flexible bag having a spout adjacent the lower end of said rear bulkhead adapted to fit within the aligned discharge openings in said bulkhead and said rear support frame upon removal of said flap for the flow of particulate material from the flexible bag upon tilting of said container for unloading of said container.

* * * * *